(12) United States Patent
Eure et al.

(10) Patent No.: US 9,555,976 B2
(45) Date of Patent: Jan. 31, 2017

(54) BEARING STAND-OFF DEVICES

(71) Applicant: Solus Industrial Innovations, LLC, Florence, KY (US)

(72) Inventors: Tom Eure, Clayton, NC (US); Scott Phillips, Valparaiso, IN (US)

(73) Assignee: Solus Industrial Innovations, LLC, Florence, KY (US)

( * ) Notice: Subject to any disclaimer, the term of this patent is extended or adjusted under 35 U.S.C. 154(b) by 245 days.

(21) Appl. No.: 14/339,315

(22) Filed: Jul. 23, 2014

(65) Prior Publication Data

US 2015/0026983 A1 Jan. 29, 2015

Related U.S. Application Data

(60) Provisional application No. 61/858,993, filed on Jul. 26, 2013.

(51) Int. Cl.
*B65G 39/09* (2006.01)
*F16C 35/00* (2006.01)
*F16C 43/00* (2006.01)

(52) U.S. Cl.
CPC .............. *B65G 39/09* (2013.01); *F16C 35/00* (2013.01); *F16C 43/00* (2013.01); *F16C 2235/00* (2013.01); *Y10T 29/49679* (2015.01); *Y10T 29/53104* (2015.01)

(58) Field of Classification Search
CPC ... Y10T 29/49696; B65G 39/09; B65G 39/10; B65G 39/12; B65G 39/125; B65G 39/14; B65G 39/145; B65G 39/16; B65G 39/18; B65G 13/00; B65G 13/11
See application file for complete search history.

(56) References Cited

U.S. PATENT DOCUMENTS

| | | | | |
|---|---|---|---|---|
| 1,353,874 A | * | 9/1920 | Wego | B65G 39/09 384/505 |
| 2,983,352 A | * | 5/1961 | De Flora | B65G 13/11 193/35 R |
| 3,204,680 A | | 9/1965 | Barry | |
| 3,252,556 A | * | 5/1966 | Isacsson | B65G 13/11 193/35 R |

(Continued)

FOREIGN PATENT DOCUMENTS

| | | |
|---|---|---|
| EP | 1734272 A2 | 12/2006 |
| KR | 1120030 B1 | 3/2012 |
| WO | WO 2015/013457 A2 | 1/2015 |

OTHER PUBLICATIONS

Bishop-Wisecarver Group, "DualVee Original Vee Guide Wheels and Components Catalog," in 8 pages, Nov. 2011.

(Continued)

*Primary Examiner* — Jason L Vaughan
(74) *Attorney, Agent, or Firm* — Knobbe, Martens, Olson & Bear, LLP

(57) ABSTRACT

Various embodiments of stand-off devices and methods are disclosed. The stand-off device can space a bearing assembly apart from a support, such as a frame of a conveyor belt, thereby providing access between the bearing assembly and the frame, such as for cleaning fluid. Certain embodiments of the stand-off device include a first end and a second end, with the first end being receivable in a securing hole of the bearing assembly and the second end configured to protrude from the bearing assembly.

15 Claims, 8 Drawing Sheets

(56) References Cited

U.S. PATENT DOCUMENTS

| | | | |
|---|---|---|---|
| 3,593,591 A | 7/1971 | Chantland | |
| 3,768,614 A * | 10/1973 | Tabler | B65G 13/00 |
| | | | 193/37 |
| 3,934,953 A * | 1/1976 | Tooley | F16C 35/00 |
| | | | 29/898.07 |
| 4,100,368 A | 7/1978 | Thomsen | |
| 4,448,302 A | 5/1984 | Weaver et al. | |
| 4,508,212 A | 4/1985 | Bolle et al. | |
| 4,681,203 A * | 7/1987 | Kornylak | B65G 13/11 |
| | | | 193/35 R |
| 5,163,210 A | 11/1992 | Lostra | |
| 5,361,884 A * | 11/1994 | Yonezawa | B29C 45/1756 |
| | | | 193/35 R |
| 5,427,218 A * | 6/1995 | Yonezawa | B60B 33/00 |
| | | | 193/35 R |
| 5,645,155 A * | 7/1997 | Houghton | B65G 39/12 |
| | | | 193/35 R |
| 5,971,618 A | 10/1999 | Ledingham | |
| 6,008,556 A | 12/1999 | Ramthun | |
| 6,112,875 A * | 9/2000 | Gibson | B65G 13/00 |
| | | | 193/35 R |
| 6,454,082 B1 | 9/2002 | McTaggart et al. | |
| 6,493,939 B2 | 12/2002 | Ledingham | |
| 6,752,534 B2 | 6/2004 | Ledingham | |
| D657,807 S | 4/2012 | Frazier | |
| 8,186,031 B2 * | 5/2012 | Whitney | B25B 27/062 |
| | | | 29/258 |
| D672,794 S | 12/2012 | Frazier | |
| 2001/0014190 A1 | 8/2001 | Ledingham | |
| 2006/0038452 A1 | 2/2006 | Lesak | |

OTHER PUBLICATIONS

Bishop-Wisecarver Group, "DualVee Motion Technology Catalog," in 48 pages.

EDT Corp, "Poly-Round Solution Mounted Bearings Specification," in 30 pages, May 2013.

International Preliminary Report on Patentability in related International Patent Application No. PCT/US2014/047905, mailed Feb. 4, 2016, in 8 pages.

International Search Report and Written Opinion in related International Patent Application No. PCT/US2014/047905, mailed Nov. 17, 2014, in 9 pages.

* cited by examiner

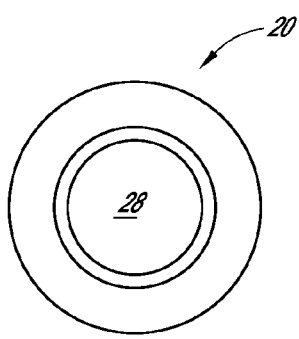
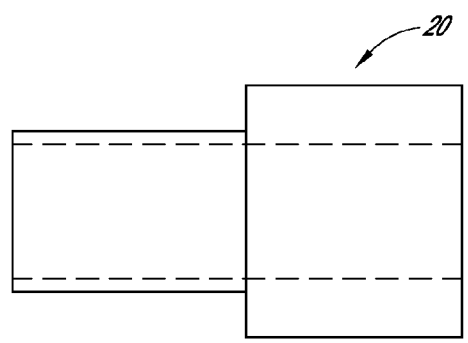
FIG. 3A          FIG. 3B
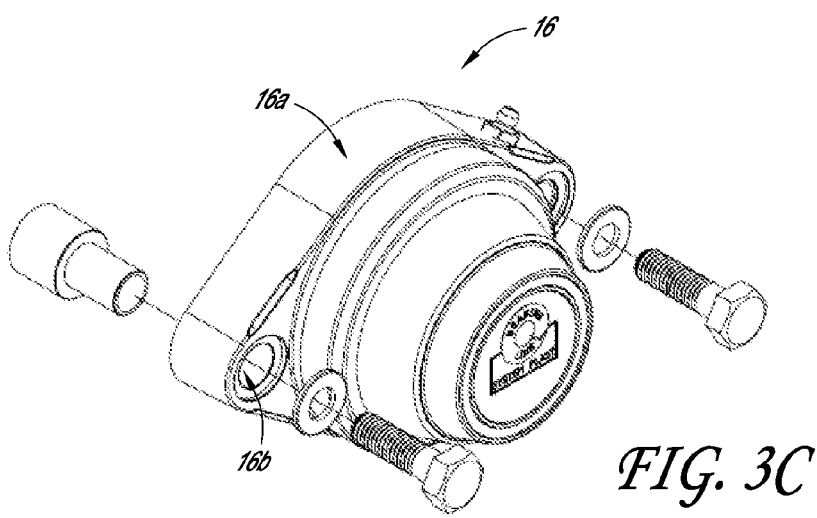
FIG. 3C
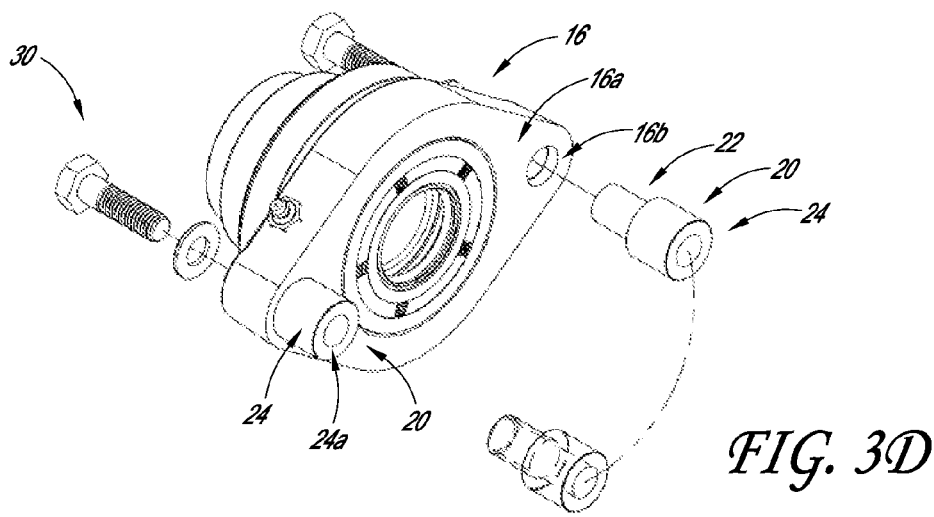
FIG. 3D

BEARING STAND-OFF DEVICES

CROSS REFERENCE TO RELATED APPLICATION

The present application claims the priority benefit under at least 35 U.S.C. §119 of U.S. Patent Application No. 61/858,993, filed Jul. 26, 2013, the entirety of which is incorporated by reference herein.

BACKGROUND

Field

The present disclosure relates to facilitating access to portions of processing equipment, such as access for cleaning fluid between a bearing assembly and a frame.

Description of the Related Art

Processing equipment, such as conveyor systems, is used for a variety of purposes. For example, conveyor systems are used to transport articles from a first location to a second location. These systems can include a conveyor belt (or chain) that is arranged in an endless loop and driven to convey the objects on the belt surface. The belt can be supported by rotatable elements, such as rollers, at certain locations along the length of the belt. Portions of the rollers can be journaled (e.g., installed) in bearing assemblies that are mounted to a frame or other support structure of the conveyor assembly. This allows the rollers to transfer a portion of the weight of the belt and the conveyed product to the frame, while also permitting the rollers to rotate relative to the frame and the belt.

SUMMARY

Sanitation standards and demands are becoming increasingly stringent for processing equipment. For example, private and/or governmental parties are imposing ever more rigorous cleanliness requirements for systems that convey and/or process food (e.g., meat, poultry, produce, or other food), beverages, medical items (e.g., pharmaceuticals), electronics, manufactured goods (e.g., aerospace or automotive parts), and/or other articles.

As noted above, certain conveyor systems include a belt (or chain) that is partially supported by one or more rollers that is journaled in a bearing assembly that is mounted to the frame of the conveyor. Typically, the bearing assembly includes a housing and a rotation unit (e.g., inner and outer rings and rolling elements). In some systems, the bearing assembly is mounted directly onto the frame, such as a back face of the bearing assembly being generally flush with the frame. This can be problematic because pathogens (e.g., bacteria and viruses) and small contaminants (e.g., dust, dirt, portions of conveyed product, etc.) can penetrate between the frame and the bearing assembly. This can lead to unsanitary conditions. Moreover, even if the conveyor system is washed with cleaning fluid, because the back face of the bearing assembly is flush against the frame, there is limited potential for the cleaning fluid to access the area between the bearing assembly and the frame. Thus, the bacterial growth and contaminant accumulation can continue, which can lead to a reduction in bearing life, failures of cleanliness inspection, health code violations, or other issues. Furthermore, mounting the bearing assembly directly to the frame can result in fluid (e.g., cleaning liquid) that penetrates between the bearing assembly and the frame being held there, such as by weeping or capillary action. This can lead to corrosion of the bearing assembly and/or frame, growth of mold or other organisms, or other issues.

To facilitate access by cleaning fluid between the bearing assembly and the frame, the bearing assembly can be spaced away from the frame. For example, one or more thick washers (e.g., spacers) can be used to separate the bearing assembly from the frame. This can be done by an installer passing a fastener (e.g., a bolt) through an aperture in the bearing assembly, through the washer, into a hole in the frame, and into a securing nut. The result is that the washer resides between the bearing assembly and the frame. As the bolt and nut are secured, the washer provides a physical interference that stops the bearing assembly from being mated flush against the frame. With continued tightening, the bolt and nut secure the bearing assembly to the frame with the washer sandwiched between the bearing assembly and the frame, thereby spacing apart the bearing assembly and the frame. However, use of such a washer can be clumsy and is inconvenient. For example, use of the washer requires the installer to manage and manipulate (e.g., align the holes of) the bearing assembly, washer, frame, and nut, which can be difficult. The difficulty can be exacerbated in the not uncommon situation in which the bearing assembly is positioned in a location with tight spacial constraints and/or limited visibility. Indeed, some bearing assemblies are positioned in locations such that maintenance is largely done by touch (e.g., without the installer directly or indirectly seeing the bearing assembly). Thus, aligning the washer with all of the other components can be difficult and/or impractical.

Another way to space the bearing assembly from the frame is to use a bearing assembly that includes a housing with integral legs. When such a housing is secured with the frame, the legs space the remainder of the bearing assembly from the frame. However, this requires a specialized design for the housing of the bearing assembly. Moreover, to retrofit a conveyor system with bearing assemblies that are mated flush with the frame with bearing assemblies having legs would require replacing the original bearing assemblies, regardless of whether those assemblies are still operational. This can be inefficient and can incur cost, both in terms of money (e.g., to obtain the bearing assemblies with legs) and time (e.g., to remove each of the old bearing assemblies from the frame and the shafts and replace each with a bearing assembly with legs).

To ameliorate and/or solve some of the concerns mentioned above, or other concerns, several embodiments of stand-off devices are disclosed. In some embodiments, the stand-off device includes a nesting portion and a spacing portion. The nesting portion can be configured to be received in a securing hole in a bearing housing and the spacing portion can be configured to protrude from the securing hole. When the bearing housing is mated with a frame, such as the frame of a conveyor system, the spacing portion can provide a physical interference that limits how closely the bearing housing can be mated with the frame, thereby providing space between the bearing housing and the frame. In some embodiments, the stand-off device facilitates fluid accessing between the bearing housing and the frame and/or facilitates fluid exiting from between the bearing housing and the frame. Certain embodiments facilitate inspection (e.g., visual inspection) between the bearing housing and the frame.

The stand-off device provides advantages over the aforementioned approaches. As noted above, one approach is to use thick washers, which can be clumsy and can increase the difficulty of installing the bearing assembly. For example, an installer typically needs to hold and manipulate the bearing housing, place the bolt through mounting holes in the bearing housing, slide the washer onto the bolt, slide the bolt into the frame (while being careful not to let the washer slide off the bolt), and then hold the entire assembly while tightening the bolt and nut. This can be difficult and time-consuming, especially in installing bearing assemblies in hard-to-reach places, places with little space for movement, limited visibility, or other factors that make the installation more difficult and/or complex. In contrast, certain embodiments of the stand-off device are configured to reduce the complexity of the installation process and/or to ease installation of the stand-off device. In some embodiments, the stand-off device is a one piece unit that can be partially received into the bearing housing, such as with a press fit. This can fixedly join the stand-off device and the bearing housing and/or can maintain the stand-off device relative to the bearing housing (e.g., in alignment). In some embodiments, fixedly joining the stand-off device with the bearing assembly allows the bearing assembly and stand-off device to be manipulated as a single unit, thereby reducing the number of pieces that are involved (e.g., need to be held in place by the installer) during installation. The stand-off device can thus simplify and/or ease installation, such as in confined spaces with little room for user movement, limited visibility, or otherwise.

The stand-off device also offers advantages over the bearing assemblies with legs. As previously described, bearings housing with legs require a specialized bearing assembly design. To convert a conveyor assembly that has bearing assemblies without legs to a conveyor assembly that has bearing assemblies with legs would require replacing the bearing assemblies without legs, regardless of whether those bearing assemblies are still operational. In contrast, the stand-off device can be used with non-specialized bearing housings, such as those that do not have legs. The stand-off device can thus facilitate retrofitting and/or can be installed without replacing the bearing assemblies. For example, the bearing assembly without legs can be removed from the frame, one or more (e.g., 2, 3, 4, or more) of the stand-off devices can be placed between the bearing assembly and the frame, and the bearing assembly can be re-secured to the frame (e.g., by securing the bolts).

Various embodiments of the stand-off device can be used with new and existing bearing housing assemblies, which can facilitate assembly and retrofitting of processing equipment (e.g., conveyors) already in the field. In some embodiments, the stand-off device can be installed into the bearing housing, such as with a small press and/or by placing the assembly on a flat surface and applying a force, such as with a hammer. For example, the nesting portion of the stand-off device can be pressed into a hole in the bearing housing. Certain embodiments of the bearing assembly can be mounted with the frame by passing a bolt through holes in the bearing assembly and the stand-off device, passing the bolt through the frame, and securing the bolt with a nut. In some variants, the stand-off device can be field retrofitted without the need for a special molded housing assembly and/or other replacement parts. Some embodiments of the stand-off device allow the user to recycle and/or reuse some existing conveyor assembly parts (e.g., the bearing housing, the conveyor shaft, etc.), which can reduce costs, reduce waste, and speed the installation process. Some embodiments of the stand-off device can be used without the need for special handling of components or special housing assemblies.

Some embodiments of the stand-off device promote efficiency, such as by reducing the number of bearing housing designs to be produced, stocked, inventoried, maintained, and/or requisitioned. For example, certain variants of the stand-off device can eliminate the need for a housing with legs, thereby eliminating the need to produce or obtain multiple housing types (e.g., with legs and without legs). Thus, the stand-off device allows a reduction in the total number of bearing housing designs, while maintaining the ability to space the bearing housing apart from the frame. Certain embodiments of the stand-off device allow the production and inventory of a single type of bearing housing. For example, the stand-off device can allow a bearing assembly manufacturer to produce only bearing housings without legs, which can be used with or without the stand-off device.

Certain embodiments of the stand-off device increase the amount of surface area accessible by cleaning fluid compared to some bearing housings with legs. Some leg bearing housings have a relatively large surface area that contacts the conveyor side frame, thereby leaving more area generally inaccessible by cleaning fluid. In contrast, the size of the portion of the stand-off device that contacts the frame can be reduced, thereby allowing more exposure of the conveyor side frame to the cleaning fluid.

Several illustrative embodiments are disclosed in this specification. Any feature, structure, or step disclosed in connection with any embodiment can be replaced with or combined with any other feature, structure, or step disclosed in connection with any other embodiment, or omitted. Further, for purposes of summarizing the disclosure, certain aspects, advantages, and features of the inventions have been described herein. However, not all embodiments include or achieve any or all of those aspects, advantages, and features. No individual aspects of this disclosure are essential or indispensable.

BRIEF DESCRIPTION OF THE DRAWINGS

Various embodiments are depicted in the accompanying drawings for illustrative purposes, and should in no way be interpreted as limiting the scope of the embodiments. Any features, structures, components, materials, and/or steps of any of the embodiments can be combined with any features, structures, components, materials, and/or steps of any other of the embodiments to form additional embodiments, which are part of this disclosure.

FIG. 3A illustrates a top view of another embodiment of a stand-off device.

FIG. 3B illustrates a side view of the stand-off device of FIG. 3A.

FIGS. 3C and 3D illustrate front and rear perspective partially exploded views of a bearing assembly that includes the stand-off device of FIG. 3A.

DETAILED DESCRIPTION OF CERTAIN EMBODIMENTS

Various embodiments of stand-off devices are described herein. Certain embodiments are discussed in the context of mating bearing assemblies with conveyor frames, due to particular utility in that context. However, the inventions disclosed herein can be used in other contexts as well, such as to mate bearing assemblies—or other types of assemblies—with other types of structures, such as frames or housings of non-conveyor systems. Further, although the inventions are described herein in reference to various embodiments and drawings, such embodiments and drawings are not intended to be limiting. On the contrary, variations and improvements may be accomplished in view of these teachings without deviating from the scope and spirit of the invention and are within the scope of this disclosure.

Overview

Figure 1:
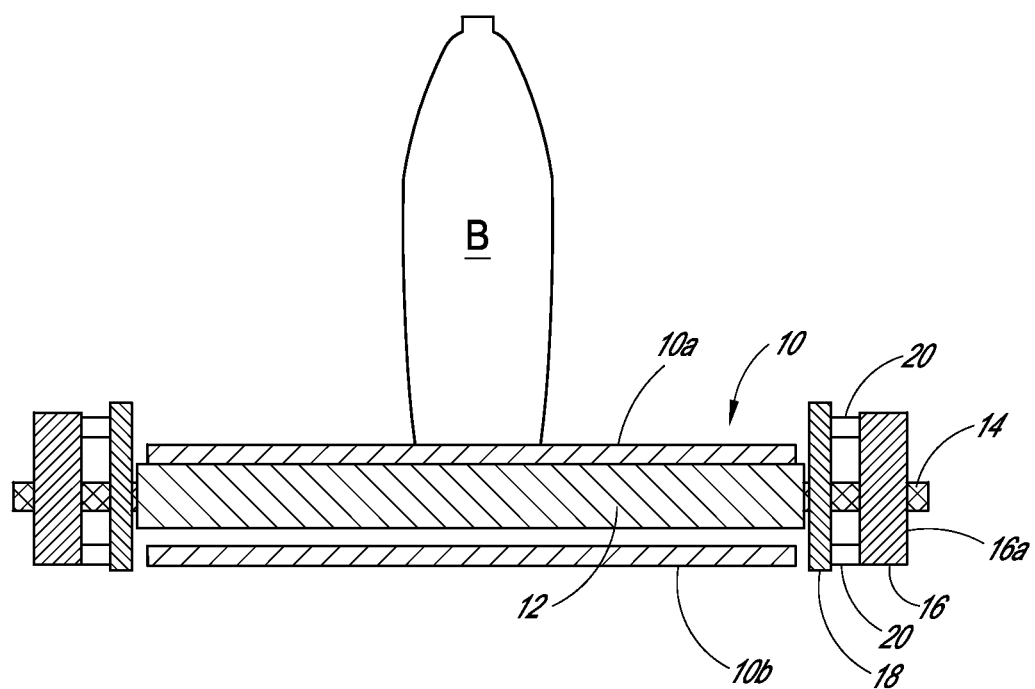
FIG. 1 illustrates a schematic cross-sectional view (looking generally parallel to the direction of belt travel) of a conveyor belt assembly that includes a stand-off device.

FIG. 1 shows an illustrative conveyor system including a stand-off device 20, with the view being generally parallel to the direction of belt travel. As shown, the system includes a belt 10 (or chain) that is supported on a support element, such as a roller 12. The belt 10 can be of an endless type, such that it includes a conveying portion 10*a* and a return portion 10*b*. The conveying portion 10*a* can convey articles, such as the illustrated bottle B, and can be supported by the roller 12. The roller 12 can be supported on a rotatable shaft 14, which in turn is supported by a bearing assembly 16. The bearing assembly 16 can include bearings (not shown) mounted in a bearing housing 16*a*. The system can be used to convey various articles, such as food (e.g., meat, poultry, produce, or other food), beverages (e.g., soda, juice, beer, milk or other dairy liquids, or other beverages), medical items (e.g., pharmaceuticals), electronics, manufactured goods (e.g., aerospace or automotive parts), and/or other articles.

As illustrated, the bearing assembly 16 can be spaced apart from the frame 18 (e.g., sidewall, guide, casing, support, or otherwise) by one or more of the stand-off devices 20. For example, as discussed in more detail below, the stand-off device 20 can provide a physical interference between the bearing housing 16*a* and the frame 18, thereby providing space for fluid to flow between the bearing housing 16*a* and the frame 18. For presentation purposes, the description below discusses the use of cleaning fluid (e.g., soap and water, sanitizing and/or anti-bacterial liquids, scrubbing agents, etc.), however other types of fluids can be used (e.g., lubricants, inspection fluids, or other fluids). The fluid can comprise a liquid and/or a gas.

Figure 2A:
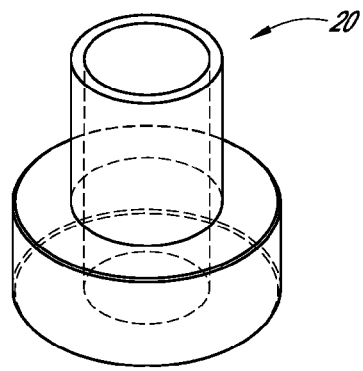
FIG. 2A illustrates a front perspective view of an embodiment of a stand-off device.
Figure 2B:
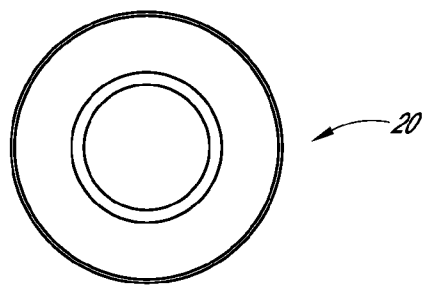
FIG. 2B illustrates a top view of the stand-off device of FIG. 2A.
Figure 2C:
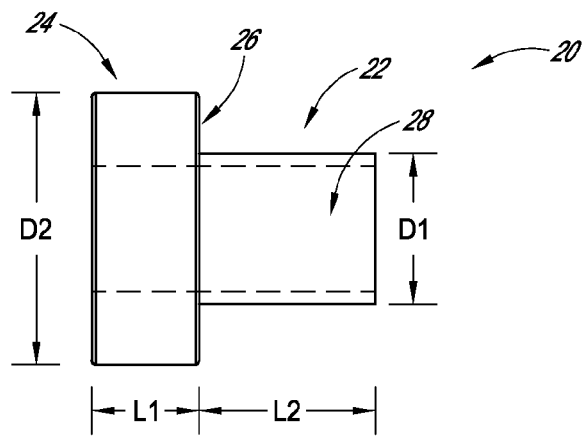
FIG. 2C illustrates a side view of the stand-off device of FIG. 2A.

FIGS. 2A-2C illustrate an example embodiment of a stand-off device 20. As shown, the stand-off device comprises a nesting portion 22 (e.g., a first end or a ferrule) and a spacing portion 24 (e.g., a second end). In some embodiments, a shoulder 26 is located between, and/or provides the transition between, the nesting and spacing portions 22, 24. The embodiment shown in FIGS. 2A-2C has nesting and spacing portions 22, 24 that are generally cylindrical in shape (e.g., are generally circular in cross-sectional shape). In some embodiments, one or both of the nesting and spacing portions 22, 24 have a different cross-sectional shape, such as generally: triangular, square, rectangular, hexagonal, octagonal, or other regular or irregular shapes. The nesting and spacing portions 22, 24 can have the same cross-sectional shape or different cross-sectional shapes.

The stand-off device 20 can have various sizes and configurations. For example, as shown, the nesting portion 22 can have a diameter D1 that is smaller than a diameter D2 of the spacing portion 24. In some embodiments, the ratio of D1 to D2 can be at less than or equal to about: 0.8, 0.7, 0.6, 0.5, 0.4, values between the aforementioned values, or other values. In certain variants, the ratio of D1 to D2 is greater than or equal to about 0.4 and/or less than or equal to about 0.8, between about 0.5 and about 0.7, or other ratios. In some embodiments, the nesting portion 22 has a longitudinal length L1 that is greater than or equal to a longitudinal length L2 of the spacing portion 24. For example, the ratio of the length of L1 to L2 can be at least about: 1.1, 1.25, 1.5, 2, 2.5, 3, values between the aforementioned values, or other values. In some embodiments, D1 is less than D2. For example, the ratio of the length of L1 to L2 can be at less than or equal to about: 0.95, 0.9, 0.8, 0.7, 0.6 0.5, values between the aforementioned values, or other values. In some embodiments, the diameters D1, D2 and/or the lengths L1, L2 can be increased or decreased (e.g., to facilitate engagement of the stand-off device 20 with the bearing housing 16*a* and/or to provide a desired amount of spacing between the bearing housing 16*a* and the frame 18). Some embodiments have a length L1, and/or a length L2, that is at least about: 7 mm, 10 mm, 12 mm, 15 mm, 19 mm, 25 mm, 30 mm, 35 mm, values between the aforementioned values, or other values.

As shown, the stand-off device 20 can include a port 28 (e.g., a lumen). The port 28 can extend longitudinally through some or all of the stand-off device 20, such as along a longitudinal centerline of the stand-off device 20. The port 28 can receive a fastener 30 (see FIG. 3D), such as a bolt, rivet, or other connector. As discussed in more detail below, the fastener 30 can be secured (e.g., with a mating nut) to hold the bearing assembly 16 relative to the frame 18 and/or to hold the stand-off device 20 between the bearing assembly 16 and the frame 18.

In some embodiments, one or both of the nesting and spacing portions 22, 24 is metal (e.g., stainless steel, aluminum, brass, or another metal), plastic (e.g., polyethylene, polypropylene, nylon, polytetrafluoroethylene, or another plastic), rubber, composite or other suitable material. In some embodiments, the nesting and spacing portions 22, 24 are made of the same material. In certain variants, the nesting and spacing portions 22, 24 are made of different materials, such as metal and plastic. In some embodiments, the stand-off device 20 is made of a corrosion resistant material. In certain variants, the stand-off device 20 is not made of a corrosion resistant material. In some embodiments, the stand-off device 20 is coated or plated, such as with nickel.

In some variants, the nesting and spacing portions 22, 24 comprise a single piece (e.g., an integrally formed component). For example, the nesting and spacing portions 22, 24 can be molded, machined, or otherwise formed as a unitary part. In some embodiments, the stand-off device 20 is fabricated of two or more different pieces and/or of two or more different materials. The pieces and/or materials can be joined together, such as with an adhesive, weld (e.g., thermal or sonic), or other bond.

In some embodiments, the stand-off device 20 is magnetic. In certain implementations, this can aid in retaining the stand-off device 20 in the bearing assembly 16, such as before the bolt 30 is fed through the port 28 and/or before the bearing assembly 16 is secured relative to the frame 18. In some embodiments, the nesting portion 22 is magnetic, which can provide a magnetic force to facilitate insertion of and/or to hold the stand-off device 20 in the bearing assemblies 16 made of certain metals, such as cast iron or steel. In some embodiments, the spacing portion 24 is magnetic.

Engagement of the Stand-Off Device and Bearing Assembly

Another embodiment of the stand-off device 20 is illustrated in FIGS. 3A-3D. As shown, the stand-off device 20 is a separate component that can be engaged with the bearing assembly 16. For example, the nesting portion 22 of the stand-off device 20 can be received in a securing hole 16b (also called an anchor hole) in the housing 16a. The engaged combination of the stand-off device 20 and the housing 16a is called a "housing stand-off assembly."

In some embodiments, the diameter D1 of the nesting portion 22 is less than the diameter of the securing hole 16b. In some embodiments, the nesting portion 22 is received into the securing hole 16b so as to be secure in the hole 16b, which can aid in maintaining the stand-off device 20 in the housing 16a and can ease installation and/or use. For example, the nesting portion 22 can have a friction fit with the securing hole 16b. In some variants, the engagement between the nesting portion 22 and the walls defining the securing hole 16b is sufficient to counteract gravity. For example, in some implementations, the stand-off device 20 does not fall out of the securing hole 16b when the housing stand-off assembly is positioned such that the spacing portion 24 is between the bearing assembly 16 and the ground. In some implementations, the stand-off device 20 improves the alignment of the stand-off device 20 and the bearing assembly 16 by holding at least a majority of the length of the port 28 in the stand-off device 20 generally concentric with the securing hole 16b.

In some embodiments, some or all of the spacing portion 24 is not receivable in the securing hole 16b. For example, the diameter D2 of the spacing portion 24 can be greater than or equal to the diameter of the securing hole 16b. As shown in FIG. 3D, when the stand-off device 20 is engaged with the bearing housing 16a, some or all of the spacing portion 24 protrudes out of the housing 16a (e.g., remains on the exterior of the housing 16a).

The stand-off device 20 can be used in connection with a variety of bearing assemblies 16. For example, the bearing assembly 16 can be a pedestal or pillow block bearing, a flanged bearing (e.g., a round or square flanged bearing), or other type of bearing. The bearing assembly 16 can include ball bearings, roller bearings, or other types of bearings. The bearing assembly 16 can have one or multiple of the securing holes 16b, such as 2, 3, 4, or more. In some implementations, a stand-off device 20 is engaged with each securement hole 16b in the bearing assembly 16. For example, as shown in FIG. 3D, the bearing assembly 16 can have two securement holes 16b and a stand-off device 20 can be engaged with each of those securement holes 16b. Various implementations include two, three, four, five, six, or more stand-off devices 20.

In several embodiments, the spacing portion 24 spaces the bearing assembly 16 and the frame 18. In certain implementations, this is because, when the housing stand-off assembly is mounted with the frame 18, the spacing portion 24 presents a physical interference between the frame 18 and the bearing assembly 16. This can limit how close the bearing assembly 16 can be mounted relative to the frame 18 and/or can space the bearing assembly 16 apart from the frame 18. In various embodiments, the space between the bearing assembly 16 and the frame 18 can provide access for fluid (e.g., cleaning liquid) to enter and/or exit. In some embodiments, the space between the bearing assembly 16 and the frame 18 allows inspection (e.g., visual or otherwise) between the bearing assembly 16 and the frame 18. As indicated above, the spacing portion 24 can have a length L2, which can also be called the "stand-off distance." In some embodiments, the stand-off distance is at least about: 7 mm, 10 mm, 12 mm, 15 mm, 19 mm, 25 mm, 30 mm, 35 mm, values between the aforementioned values, or other values. As shown, a washer can be inserted between the fastener 30 and the bearing housing 16a; other embodiments do not include the washer.

As also shown, a fastener 30 can be engaged through the port 28 of the stand-off device 20. For example, in some embodiments, the fastener 30 passes along a longitudinal centerline of nesting and spacing portions 22, 24. The fastener 30 can be secured relative to the frame 18, such as with a nut, by engaging threads in the frame 18, or otherwise. In several embodiments, this can secure the housing stand-off assembly with the frame 18, which can permit the shaft of the roller 12 to be re-journaled (e.g., reinserted) in the bearing assembly 16 to support the roller 12 and the conveying portion 10a of the belt 10, while also providing access for cleaning fluid between the bearing assembly 16 and the frame 18.

In various implementations, the stand-off device 20 is configured to support the fastener 30. For example, certain embodiments of the stand-off device 20 are configured such that an installer can insert the fastener 30 through the port 28 and have the fastener 30 remain in the port 28 (e.g., not fall out due to gravity when the stand-off device 20 is generally horizontal). This can make installation of the housing stand-off assembly more convenient and/or easier. In some variants, when the fastener 30 is received through the port 28 of the stand-off device 20, and the nesting portion 22 of the stand-off device 20 is received in the bearing assembly 16, and the longitudinal centerline of the nesting and spacing portions 22, 24 is generally horizontal, the fastener 30 does not fall out of the port 28 and/or is held in a generally horizontal position. In certain embodiments, the stand-off device 20 can receive and hold the fastener 30 generally parallel to the longitudinal centerline of the nesting and spacing portions 22, 24 and/or generally parallel to a longitudinal centerline of the securing hole 16b. Some embodiments of the stand-off device 20 receive and hold the fastener 30 generally concentric with the port 28 (e.g., a concentricity of within less than or equal to 5% of the diameter of the port 28 along the length of the port 28). In some embodiments, the stand-off device 20 is configured such that the fastener 30 does not fall out of the port 28 when the fastener 30 is installed through at least 75% of the length of the port 28 and the stand-off device 20 is less than or equal to 20° from perfectly horizontal. In some variants, the longitudinal length of the port 28 is less than the length of the fastener 30, such as less than or equal to about 60%, about 40%, or about 20% of the length of the fastener 30.

As mentioned above, the stand-off device 20 can facilitate access between the bearing assembly 16 and the frame 18, such as by cleaning fluid. In some embodiments, positioning the stand-off device 20 between the bearing assembly 16 and the frame 18 in the manner described in this specification provides ready access by cleaning fluid to at least about 90% of the surface area between the bearing housing 16a and the frame 18. In some embodiments, the percentage is higher (e.g., at least 95%) or lower (at least about 80%). As used herein, the term "surface area between the bearing housing and the frame" means the surface area of the bearing assembly 16 plus the opposing surface area of the frame 18 that would be in contact if the bearing assembly 16 and the frame 18 were directly mounted to each other (e.g., without the stand-off device 20 intervening) and in which the bearing assembly 16 has a generally planar back face and the mating portion of the frame 18 is generally planar.

Certain embodiments of the stand-off device 20 are configured to reduce and/or minimize the contact area between an end 24a of the spacing portion 24 and the frame 18. For example, the end 24a can include topography or other features to facilitate access by cleaning fluid. For instance, in some embodiments, the end 24a can include bumps, grooves, ridges, knurling, teeth, or other features that allow fluid (e.g., liquid) to pass between the stand-off device 20 and the frame 18. In some embodiments, the end 24a is tapered or otherwise configured to reduce the contact between the end 24a and the frame 18. In certain variants, the ratio of the surface area of the end 24a that contacts the frame 18, in comparison to the surface area of the face of the bearing assembly 16 that faces the frame 18 and does not contact the frame 18 due to the spacing provided by the stand-off device 20, is less than or equal to about: 1:8, 1:10, 1:15, 1:20, 1:25, values between the aforementioned values, or other values.

Sleeve Replacement

Figure 4A:
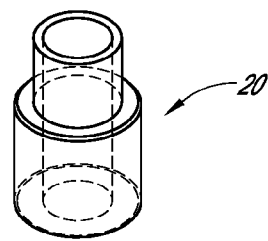
FIG. 4A illustrates a perspective view of another stand-off device.
Figure 4B:
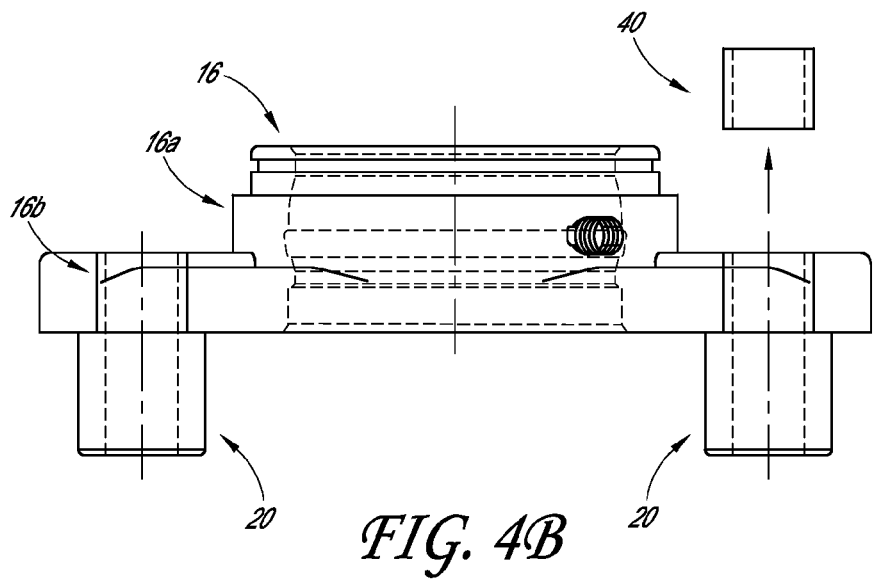
FIGS. 4B and 4C illustrate side and top views of a bearing assembly that includes the stand-off device of FIG. 4A.
Figure 4C:
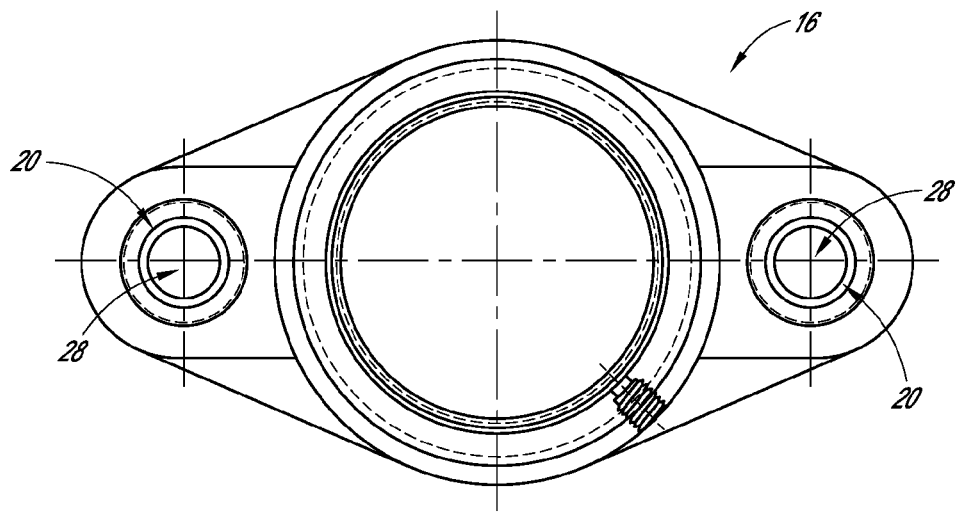

FIGS. 4A-4C illustrate another embodiment of the stand-off device 20, as well as another embodiment of the bearing assembly 16 engaged with the stand-off device 20. The bearing assembly 16 may include a sleeve 40 in the securing hole 16b. The sleeve 40 typically has a lumen through which a fastener can pass, thus enabling the bearing assembly 16 to be mated directly with (e.g., flush against the frame 18). The sleeve 40 can be made of a harder and/or more durable material compared to the housing 16b of the bearing assembly 16, such as the housing 16b being plastic or cast iron and the sleeve 40 being steel. The sleeve 40 can thus act as a buffer and/or barrier between the fastener 30 and the housing 16b and/or can inhibit or prevent the fastener 30 from causing wear to the housing 16b.

In some embodiments, the sleeve 40 is removed from the securing hole 16b. For example, the sleeve 40 can be removed with a press (e.g., an electric or hydraulic press), with a hammer, or otherwise. Removal of the sleeve 40 can increase the diameter of the securing hole 16b. In some embodiments, the nesting portion 22 of the stand-off device 20 can be inserted into the housing 16a of the bearing assembly 16 concurrent with or after removal of the sleeve 40. For example, the nesting portion 22 can have an outside diameter that is about equal to the inside diameter of the securing hole 16b after the sleeve 40 has been removed and/or to the outside diameter of the sleeve 40. In various embodiments, the stand-off device 20 can be inserted into the securing hole 16b without machining or cutting the securing hole 16b.

In some implementations, the port 28 in the stand-off device 20 is adapted to receive at least the same size (e.g., diameter) fastener as the sleeve 40. For example, if the sleeve 40 can receive a fastener with a diameter of X (e.g., at least about: 1.5 mm, 3 mm, 6 mm, 13 mm, values between the aforementioned values, or other values), the port 28 can receive a fastener with a diameter of at least X. This can allow reuse of the fasteners, such as when an existing bearing assembly 16 is retrofitted by replacing the sleeve 40 with the stand-off device 20.

Stacking

In some embodiments, the stand-off device 20 is configured to allow stacking. For example, multiple stand-off devices 20 can be serially stacked. Stacking of the stand-offs can enable a user to select the amount of stand-off distance by varying the number of stand-off devices 20 in the stack.

Figure 5:
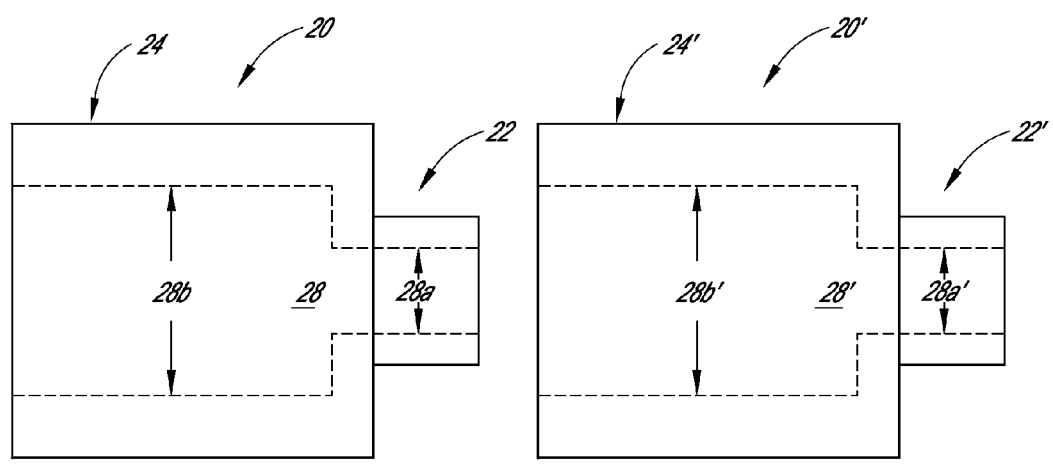
FIG. 5 illustrates a side view of two stand-off devices that are configured for stacking.

As shown in FIG. 5, the port 28 can include a first section that extends through the nesting portion 22 and that has a first diameter 28a. The port 28 can also include a second section that extends through the spacing portion 24 and that has a second diameter 28b. In certain implementations, the second diameter 28b is greater than the outside diameter D1 of the nesting portion 22 and/or greater than the first diameter 28a. In some embodiments, the second diameter 28b is at least 0.3 mm greater than the diameter D1 of the nesting portion 22 and/or at least 101% of the outside diameter D1 of the nesting portion 22. Some embodiments have a transition (e.g., a neck) between the first and second sections. The second section can have a longitudinal length that is greater than or equal to the length L1 of the nesting portion 22.

Various implementations are configured such that the nesting portion 22 of a first stand-off device 20 can be received in the second section of the port 28' of a second stand-off device 20'. This results in a stack of the first and second stand-off devices 20, 20'. In some embodiments, the first and second stand-off devices 20, 20' are substantially or completely identical (e.g., multiple iterations of the same component design).

The stacked first and second stand-off devices 20, 20' can be used to space the bearing assembly 16 from the frame 18. Similar to the discussion above, the nesting portion 22' of the second stand-off device 20' can be received in the securing hole 16b (see FIG. 3D) of the bearing assembly 16 and the fastener 30 can be passed through the port 28, 28' of the first and second stand-off devices 20, 20'. The fastener 30 can be secured relative to the frame 18, thereby sandwiching the first and second stand-off devices 20, 20' between the bearing assembly 16 and the frame 18. In some embodiments, this spaces the bearing assembly 16 from the frame 18 by sum of the length L2 (see FIG. 2C) of the spacing portions 24, 24'. Other numbers (e.g., 3, 4, 5, 6, or more) of stand-off devices 20 can be stacked to provide more or less spacing between the bearing assembly 16 and the frame 18. This can allow a user to select the amount of spacing between the bearing assembly 16 and the frame 18 with just a single configuration of the stand-off device 20.

Shaft Support

As discussed above, the bearing assembly 16 supports a roller 12, such as by journaling a rotatable shaft of the roller 12. Certain shafts are long enough such that an end of the shaft passes through the bearing assembly 16 and protrudes out the other side. For example, certain shafts supported by bearing assemblies that are mounted to the frame without using the stand-off device 20 protrude outwardly from those bearing assemblies.

As also discussed above, the stand-off device 20 spaces the bearing assembly 16 apart from the frame 18. For example, the bearing assembly 16 can be spaced from the frame 18 by the length L2 of the spacing portion 24. In some embodiments, installation of the stand-off device 20 results in the bearing assembly 16 being moved along the axis of rotation of the roller 12 by the length L2. In some embodiments, the stand-off device 20 is configured to maintain support for the shaft. For example, in some embodiments in which each end of the shaft is journaled (e.g., installed) in a respective bearing assembly 16, the length L2 (e.g., the stand-off distance) is less than or equal to about one half of the maximum distance the shaft could protrude from one of the bearing assemblies 16 if the shaft remained journaled in both of the bearing assemblies 16, and if both of the bearing assemblies 16 were mounted directly to the frame 18 (without using the stand-off device 20). In some implementations, this allows use of the same shaft, even after the stand-off device 20 has been added between the bearing assembly 16 and the frame 18, thereby facilitating retrofitting, increasing efficiency, and/or decreasing cost. In some embodiments, the same shaft is reused and/or is not replaced. Certain variants include using an extension that couples with the shaft to extend the length of the shaft. Some embodiments include using a different shaft and/or replacing the shaft.

Certain Methods Related to Stand-Off Devices

Figure 6:
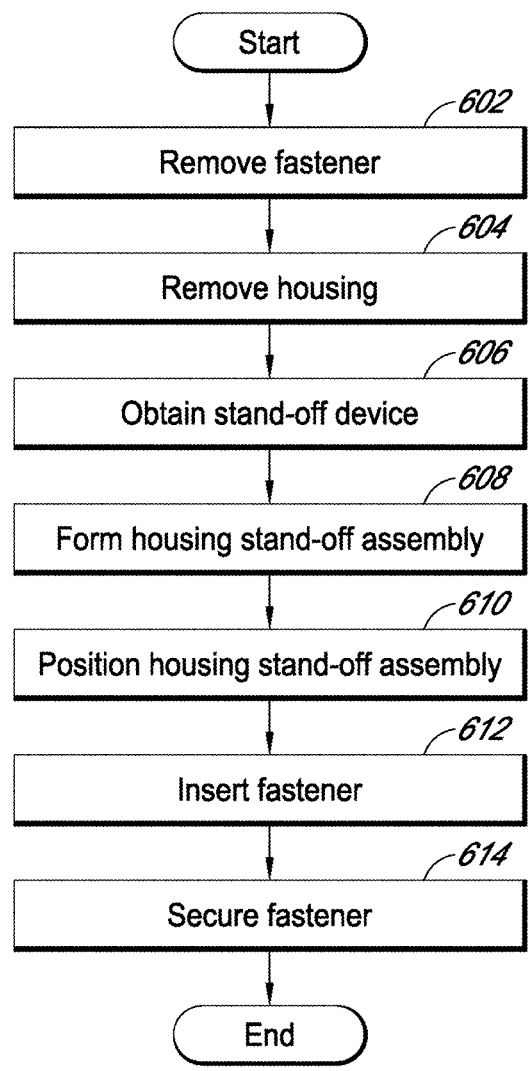
FIG. 6 schematically illustrates a method of retrofitting a bearing assembly.

Embodiments of the stand-off device 20 can be used in a variety of ways. For example, FIG. 6 schematically illustrates a method of retrofitting a bearing assembly 16. In some embodiments, in block 602, the method includes removing a fastener that is securing a bearing to a processing system, such as to a frame of a conveyor system. For example, some embodiments include unscrewing a bolt. As indicated in block 604, the method can include removing (e.g., separating) a housing of the bearing assembly from the frame.

As shown in block 606, some implementations of the method include obtaining a stand-off device. The stand-off device can include a first end having a first diameter and a first longitudinal distance and a second end having a second diameter and a second longitudinal distance. In some embodiments, the second diameter is greater than or equal to the first diameter and/or is greater than or equal to a diameter of a securing hole in the housing. The stand-off device can include a shoulder, which can be located between the first and second ends, such as about midway between the first and second ends, nearer to the first end, or nearer to the second end. The stand-off device can include a port (e.g., a lumen) that extends longitudinally between the first and second ends.

In some embodiments, as indicated in block 608, the method can include inserting the first end of the stand-off device into a securing hole in the bearing housing. In certain variants, this produces a housing stand-off assembly. Some embodiments include positioning the housing stand-off assembly relative to the frame, as shown in block 610. For example, the housing stand-off assembly can be positioned such that the second end of the stand-off is between the bearing housing and the frame. Some embodiments include spacing the bearing housing apart from the frame, such as by about the second distance, which can facilitate access (e.g., by cleaning fluid) to substantially the entire surface area between the bearing housing and the frame. Some embodiments of the method include inserting a fastener through the port in the stand-off device, as is shown in block 612. Some embodiments include securing the fastener, as is shown in block 614, which can result in the housing stand-off assembly being secured with the frame.

Certain variants include removing a shaft of the roller from the bearing assembly. Some embodiments include engaging (e.g., journaling) the same shaft in the bearing assembly after the housing stand-off assembly has been positioned relative to the frame. This can allow reuse of the shaft. Some embodiments include removing a sleeve from the securing hole in the bearing housing, such as by pushing the sleeve out of the hole. The sleeve can have an inside diameter that is about equal to a diameter of the port in the stand-off device.

Figure 7:
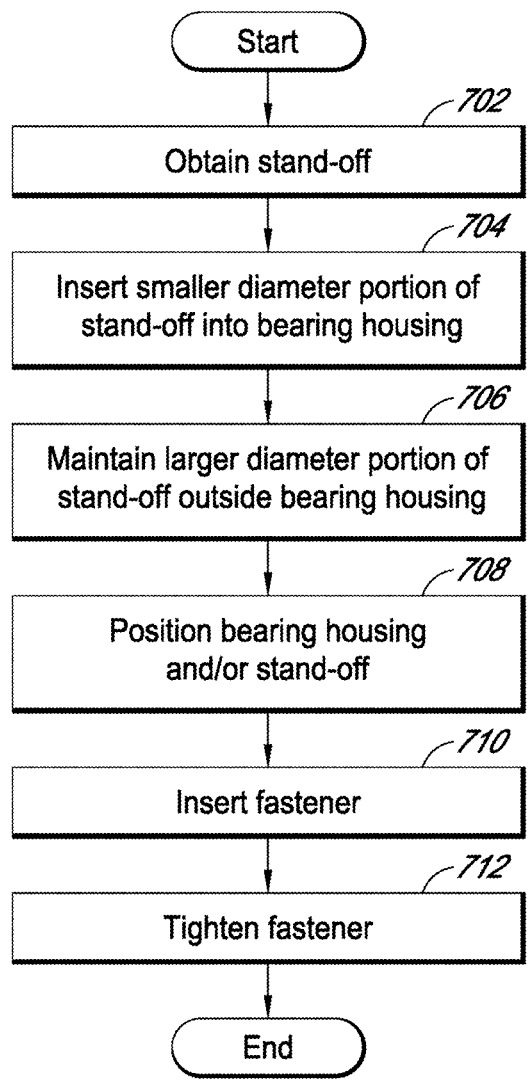
FIG. 7 schematically illustrates a method of installing a bearing housing on the frame of a processing system.

FIG. 7 schematically illustrates a method of installing a bearing housing on the frame of a processing system such that the bearing housing is positioned a distance apart from the frame. As noted above, this can provide access for, and/or facilitate a flow of, fluid between the conveyor frame and a surface of the bearing housing that faces the conveyor frame. In some implementations, as shown in block 702, the method includes obtaining a stand-off device. The stand-off device can include a smaller diameter portion, a larger diameter portion, and a port extending through the smaller diameter portion and the larger diameter portion. The port can be configured to receive a fastener therethrough.

As indicated in block 704, the method can include inserting the smaller diameter portion of the stand-off device into a channel in the bearing housing. In some embodiments, the smaller diameter portion is retained in the channel via magnetism (e.g., the smaller diameter portion is magnetic). The method can include maintaining the larger diameter portion of the stand-off device outside of the bearing housing, as illustrated in block 706. Some embodiments of the method include positioning the bearing housing such that the larger diameter portion of the stand-off is between the bearing housing and the conveyor frame, as shown in block 708. Certain embodiments include inserting a fastener through the port in the stand-off, as illustrated in block 710. In some variants, as shown in block 712, the method includes tightening the fastener, thereby securing the bearing housing with the conveyor frame. In some embodiments, at least a portion of the stand-off device is located between the bearing housing and the conveyor frame.

According to some variants, the method includes removing a sleeve from the channel in the bearing housing. In some variants, the method includes abutting (e.g., directly or indirectly) a shoulder of the stand-off device against the bearing housing. The shoulder can be between the smaller diameter portion and the larger diameter portion. Some embodiments of the method result in cleaning fluid being able to readily access at least about 95% of the surface area of the surface of the bearing housing that faces the conveyor frame.

In certain embodiments, the method includes obtaining a second stand-off device. Some embodiments include serially connecting (e.g., stacking) the stand-off devices. For example, the method can include inserting a smaller diameter portion of the second stand-off device in the port of the stand-off device. In some variants, the smaller diameter portion of the second stand-off device is received in the larger diameter portion of the stand-off device. In some embodiments, when the bearing housing is secured with the conveyor frame, the bearing housing is positioned apart from the frame by a distance that is related to the stand-off devices. For example, the distance can be greater than or equal to the sum of the longitudinal length of a larger diameter portion of the second stand-off device and the longitudinal length of the larger diameter portion of the stand-off device.

Figure 8:
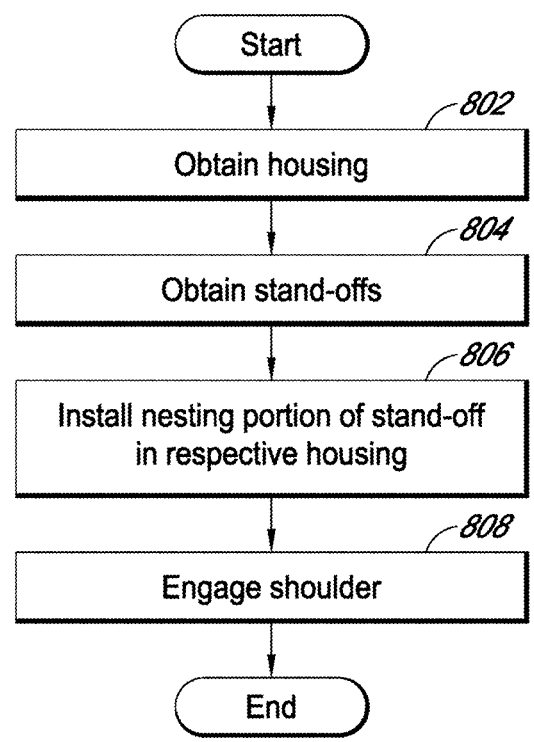
FIG. 8 schematically illustrates a method of obtaining a housing stand-off assembly.

FIG. 8 schematically illustrates a method of obtaining a housing stand-off assembly. Some embodiments of the method include obtaining a housing, as indicated in block 802. The housing can have a recess and a plurality of anchor holes. The recess can be configured to receive a rotation unit, such as a bearing, bushing, or other rotation-facilitating unit.

As illustrated in block 804, the method can include obtaining a plurality of stand-off devices. In some embodiments, some or each of the stand-off devices include some or all of: a nesting portion having a first diameter, a spacing portion having a second diameter, a shoulder, and a port. The shoulder can be positioned between the nesting and spacing portions. The port can extend through the nesting and spacing portions and can be configured to receive a fastener therethrough.

As indicated in block 806, some embodiments of the method include installing the nesting portion of one of the plurality of stand-off devices into a respective one of the plurality of anchor holes of the bearing housing. In certain implementations, the method includes engaging (e.g., abutting) the shoulder of the stand-off device with the housing, as indicated in block 808.

In some embodiments, the method includes installing the spacing portion of the stand-off device against a support, such as a frame in a conveyor system. In certain variants, the bearing housing is spaced from the conveyor frame by a distance that is greater than or equal to the length of the spacing portion. Some embodiments include installing a fastener through the port. Certain variants include removing a sleeve from the anchor hole before, or concurrent with, installing the nesting portion of the stand-off device into the anchor hole. In some variants, fluid (e.g., liquid) can readily flow into and out of the space between the support and the bearing housing and/or can access substantially the entire surface area of the opposing surfaces of the support and the bearing housing.

Certain Terminology

Several illustrative embodiments of stand-off devices and methods have been disclosed. Although the disclosure has been in the context of certain embodiments and examples, the present disclosure extends beyond the specifically disclosed embodiments to other alternative embodiments and/or uses of the stand-off devices and obvious modifications and equivalents thereof. For example, although the use of bearing assemblies is discussed, the inventions can be used in connection with other types of rotation-facilitating elements, such as assemblies that include one or more bushings. In addition, while several variations of the stand-off assemblies have been shown and described in detail, other modifications, which are within the scope of the present disclosure. This disclosure expressly contemplates that various features and aspects of the disclosed embodiments can be combined with, or substituted for, one another.

Certain features have been described in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Any portion of any of the steps, processes, structures, and/or devices disclosed or illustrated in one embodiment, flowchart, or example in this disclosure can be combined or used with (or instead of) any other portion of any of the steps, processes, structures, and/or devices disclosed or illustrated in a different embodiment, flowchart, or example. The embodiments and examples described herein are not intended to be discrete and separate from each other. Combinations, variations, and other implementations of the disclosed features are within the scope of this disclosure.

Any of the steps and blocks can be adjusted or modified. Other or additional steps can be used. None of the steps or blocks described herein is essential or indispensable. Moreover, while operations may be depicted in the drawings or described in the specification in a particular order, such operations need not be performed in the particular order shown or in sequential order, and that all operations need not be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

Terms relating to circular shapes as used herein, such as diameter or radius, should be understood not to require perfect circular structures, but rather should be applied to any suitable structure with a cross-sectional region that can be measured from side-to-side. Terms relating to shapes, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations. Likewise, shapes modified by the word "generally" (e.g., "generally cylindrical") can include reasonably close approximations of the stated shape.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. The term "and/or" means that "and" applies to some embodiments and "or" applies to some embodiments. Thus, A, B, and/or C is equivalent to A, B, and C written in one sentence and A, B, or C written in another sentence. The term "and/or" is used to avoid unnecessary redundancy.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Some embodiments have been described in connection with the accompanying drawings. The figures are drawn to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

For purposes of this disclosure, certain aspects, advantages, and novel features are described herein. Not necessarily all such advantages may be achieved in accordance with any particular embodiment. For example, some embodiments within the scope of this disclosure achieve one advantage, or a group of advantages, as taught herein without necessarily achieving other advantages taught or suggested herein. Further, some embodiments may achieve different advantages than those taught or suggested herein.
Summary Various embodiments and examples of stand-off devices and methods have been disclosed. This disclosure extends beyond the specifically disclosed embodiments and examples to other alternative embodiments and/or other uses of the embodiments, as well as to certain modifications and equivalents thereof. Moreover, this disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow.

The following is claimed:

1. A method of installing a bearing housing on a frame of a processing system such that the bearing housing is positioned a distance apart from the frame to facilitate a flow of cleaning fluid between the frame and a surface of the bearing housing that faces the frame, the method comprising:
    obtaining a stand-off device that comprises:
        a smaller diameter portion;
        a larger diameter portion; and
        a port extending through the smaller diameter portion and the larger diameter portion and configured to receive a fastener therethrough;
    inserting the smaller diameter portion of the stand-off device into a channel in the bearing housing;
    maintaining the larger diameter portion of the stand-off device outside of the bearing housing;
    positioning the bearing housing such that the larger diameter portion of the stand-off device is between the bearing housing and the frame;
    inserting a fastener through the port in the stand-off device; and
    tightening the fastener, thereby securing the bearing housing with the frame, wherein at least a portion of the stand-off device is between the bearing housing and the frame.

2. The method of claim 1, wherein the method further comprises removing a sleeve from the channel in the bearing housing.

3. The method of claim 1, wherein the method further comprises abutting a shoulder of the stand-off device against the bearing housing, the shoulder being between the smaller diameter portion and the larger diameter portion.

4. The method of claim 1, wherein the cleaning fluid can readily access at least about 95% of the surface area of the surface of the bearing housing that faces the frame.

5. The method of claim 1, further comprising retaining the smaller diameter portion of the stand-off device in the channel in the bearing housing with magnetism.

6. The method of claim 1, further comprising:
    obtaining a second stand-off device; and
    inserting a smaller diameter portion of the second stand-off device in the port of the stand-off device such that the smaller diameter portion of the second stand-off device is received in the larger diameter portion of the stand-off device,
    wherein, when the bearing housing is secured with the frame, the bearing housing is positioned apart from the frame by a distance that is at least the sum of the longitudinal length of a larger diameter portion of the second stand-off device and the longitudinal length of the larger diameter portion of the stand-off device.

7. The method of claim 1, wherein the frame of the processing system comprises the frame of a conveyor.

8. The method of claim 1, wherein at least one of the smaller diameter portion and the larger diameter portion is generally cylindrical.

9. The method of claim 1, wherein the larger diameter portion of the stand-off device being positioned between the bearing housing and the frame facilitates access by cleaning fluid to substantially the entire surface area between the bearing housing and the frame.

10. The method of claim 1, wherein the larger diameter portion of the stand-off device being positioned between the bearing housing and the frame facilitates visual access of substantially the entire surface area between the bearing housing and the frame.

11. The method of claim 1, wherein a bearing assembly comprises a rotation unit and the bearing housing, and the method further comprises:
    removing a fastener from the channel in the bearing housing;
    removing the bearing housing from the frame;
    removing a shaft of a roller from the bearing assembly; and
    journaling the same shaft in the bearing assembly after the larger diameter portion of the stand-off device is between the bearing housing and the frame.

12. The method of claim 11, wherein the rotation unit comprises a bushing, ball bearing, or roller bearing.

13. A method of obtaining a housing stand-off assembly, the method comprising:
    obtaining a housing having a recess and a plurality of anchor holes, the recess configured to receive a rotation unit;
    obtaining a plurality of stand-off devices, each comprising:
        a nesting portion having a first diameter;
        a spacing portion having a second diameter;
        a shoulder positioned between the nesting and spacing portions; and a port extending through the nesting and spacing portions and configured to receive a fastener therethrough;

removing a sleeve from one of the plurality the anchor holes of the housing before installing the nesting portion of one of the plurality of stand-off devices into the one of the plurality of anchor holes; and engaging the shoulder with the housing.

14. The method of claim 13, further comprising installing the spacing portion of the stand-off device against a conveyor frame, the bearing housing being spaced from the conveyor frame by a length of the spacing portion.

15. The method of claim 14, further comprising installing a fastener through the port.

* * * * *

UNITED STATES PATENT AND TRADEMARK OFFICE
CERTIFICATE OF CORRECTION

PATENT NO. : 9,555,976 B2
APPLICATION NO. : 14/339315
DATED : January 31, 2017
INVENTOR(S) : Tom Eure Page 1 of 1

It is certified that error appears in the above-identified patent and that said Letters Patent is hereby corrected as shown below:

In the Claims

In Column 17 at Line 4, in Claim 13, after "plurality" insert --of--.

Signed and Sealed this
Twentieth Day of August, 2019

Andrei Iancu
*Director of the United States Patent and Trademark Office*